(12) United States Patent
Den Boer et al.

(10) Patent No.: US 12,721,278 B2
(45) Date of Patent: Sep. 1, 2026

(54) SYSTEM FOR COLLECTING PLANT MATERIAL IN AN AGRICULTURAL FIELD

(71) Applicants: Nolan Den Boer, Rock Valley, IA (US); Nicholas Vande Waerdt, Rock Valley, IA (US)

(72) Inventors: Nolan Den Boer, Rock Valley, IA (US); Nicholas Vande Waerdt, Rock Valley, IA (US)

(73) Assignee: Kooima Ag, Inc., Rock Valley, IA (US)

( * ) Notice: Subject to any disclaimer, the term of this patent is extended or adjusted under 35 U.S.C. 154(b) by 323 days.

(21) Appl. No.: 18/602,675

(22) Filed: Mar. 12, 2024

(65) Prior Publication Data

US 2025/0287877 A1 Sep. 18, 2025

(51) Int. Cl.
*A01D 89/00* (2006.01)
*A01D 69/00* (2006.01)

(52) U.S. Cl.
CPC ............ *A01D 89/008* (2013.01); *A01D 69/00* (2013.01)

(58) Field of Classification Search
CPC .............................. A01D 89/008; A01D 69/00
See application file for complete search history.

(56) References Cited

U.S. PATENT DOCUMENTS 3,893,286 A * 7/1975 Buttram ............... A01D 51/002 15/82
4,015,411 A * 4/1977 van der Lely ..... A01D 78/1085 56/366
4,214,428 A * 7/1980 Caraway ................ A01D 57/12 56/341
4,753,063 A * 6/1988 Buck .................... A01D 78/144 56/370
7,412,817 B2 * 8/2008 Flora .................... A01D 51/002 56/328.1
12,137,636 B1 * 11/2024 Wentz .................. A01D 78/146

* cited by examiner

*Primary Examiner* — William D Hutton, Jr.
*Assistant Examiner* — Jose Antonio Martinez
(74) *Attorney, Agent, or Firm* — Jeffrey A. Proehl; Woods, Fuller, Shultz & Smith PC

(57) ABSTRACT

An agricultural system for collecting plant material may comprise an implement head to be moved across an agricultural field by a power unit along a path of movement. The head may have an intake opening through which plant materials move into the head. The system may further comprise a material gathering apparatus for enhancing collection of plant material, and may be carried by the head. The gathering apparatus may be selectively movable between an operational position forward of the intake opening and proximate to the ground surface to engage plant material, and an inactive position raised to a higher vertical level. The gathering apparatus may comprise a plurality of rake assemblies arranged in an array proximate to the intake opening such that the action of the rake assemblies tends to lift the material above the ground surface to facilitate intake of the plant material by the intake opening.

16 Claims, 4 Drawing Sheets

1
10
16
12
14
20
32
68
30
50
38
66
62
70
52
2

1
10
20
36
42
71
28
30
68
88
26
22
24
38
66
34
40
70

SYSTEM FOR COLLECTING PLANT MATERIAL IN AN AGRICULTURAL FIELD

BACKGROUND

Field

The present disclosure relates to agricultural plant material handling machinery, and more particularly pertains to a new system for collecting plant material in an agricultural field for increasing the effectiveness and efficiency in which plant material is collected from an agricultural field, such as stover collected from a previously-harvested agricultural field.

Description of the Prior Art

Stover, or the residual plant material left in an agricultural field after the primary field crop (such as corn) has been harvested from the field, can represent a valuable source of feed or bedding for livestock animals. The stover can be directly grazed by livestock, but can be particularly valuable for use as feed throughout the year when collected from the field and stored for times when direct grazing is undesirable. Additionally, other uses for the stover have been developed including, for example, use as an input for generating biofuels. Whether for later use as feed or as a feedstock for biofuel production, the stover needs to be collected for transportation of the stover to a location typically remote from the field.

SUMMARY

In aspects, the present disclosure relates to an agricultural system for collecting plant material near the ground surface of an agricultural field. The system may comprise an implement head which is configured to be moved across the agricultural field by a power unit along a path of movement to collect plant material from the field. The implement head has a lateral direction that is oriented transverse to the path of movement, and the implement head may have an intake opening through which plant materials move into the implement head, the intake opening extending in the lateral direction. The system may further comprise a material gathering apparatus for enhancing collection of plant material in the agricultural field. The material gathering apparatus may be carried by the implement head, and the material gathering apparatus may be selectively positionable forward of the intake opening. The material gathering apparatus may be movable between an operational position in front of the intake opening and proximate to the ground surface to engage plant material adjacent the ground surface, and an inactive position raised to a higher vertical level than the operational position so as to not be proximate the ground surface. The material gathering apparatus may comprise a plurality of rake assemblies arranged in an array proximate to the intake opening, and the rake assemblies may be positioned such that the action of the rake assemblies an upward direction with respect to the ground surface to facilitate collection of the plant material by the intake opening.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the processes or steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
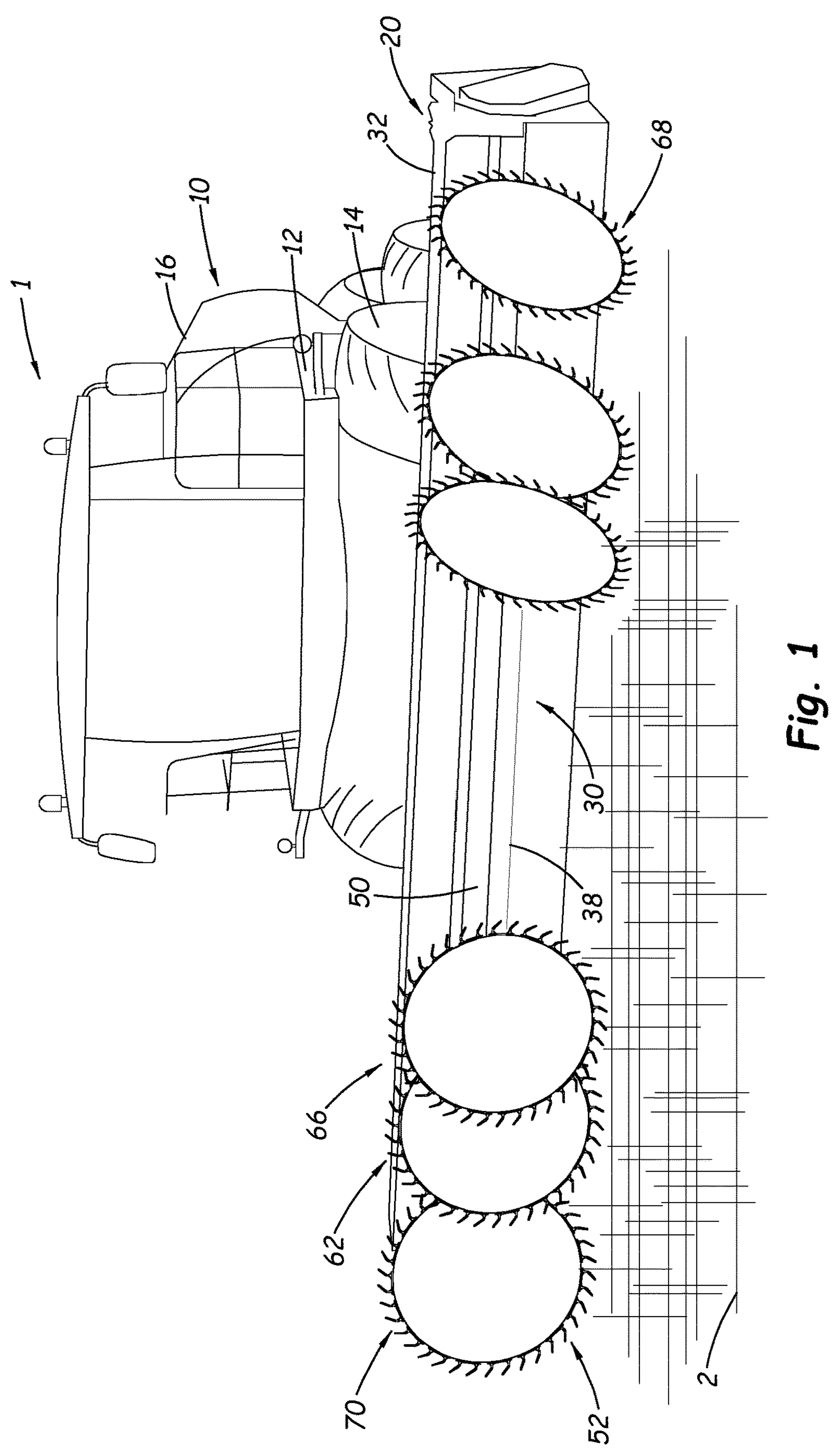
FIG. 1 is a schematic perspective view of a new system for collecting plant material in an agricultural field according to the present disclosure, with the positioning structure in the lowered position and the material gathering apparatus in the operational position.
Figure 2:
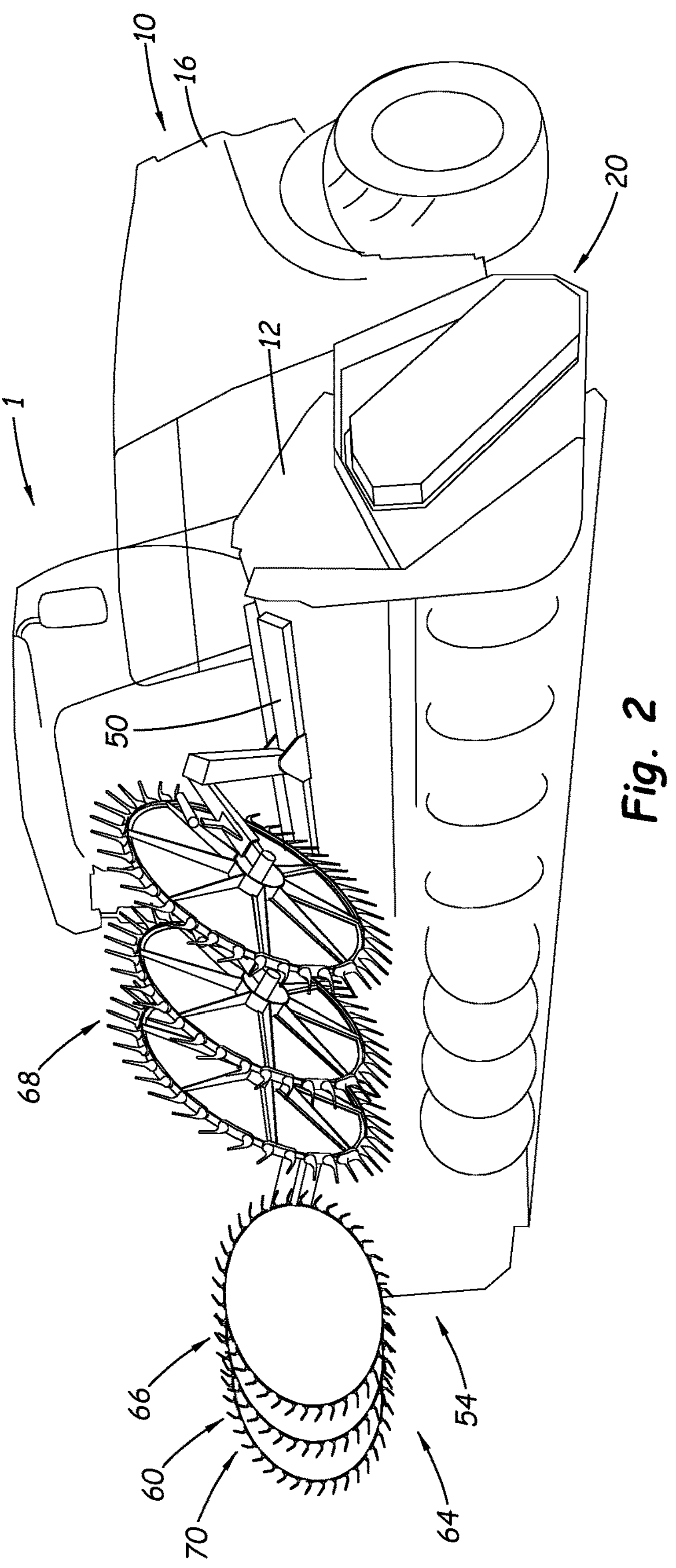
FIG. 2 is a schematic perspective view of the system according to the present disclosure, with the positioning structure in the raised position and the gathering apparatus in the inactive position.
Figure 3:
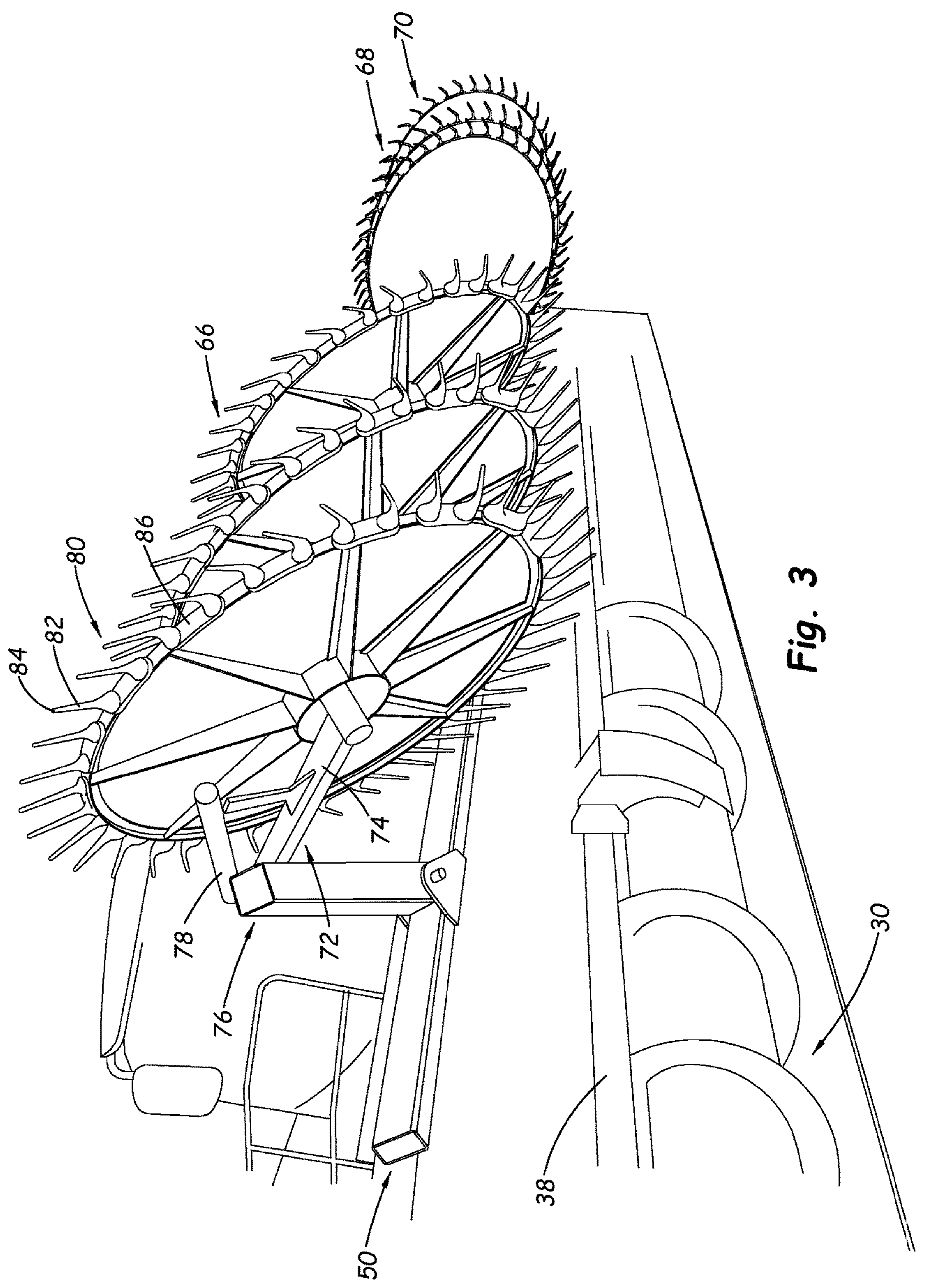
FIG. 3 is a schematic perspective view of portions of the system showing detail of the positioning structure and the rake assemblies of the gathering apparatus, according to an illustrative embodiment.

With reference now to the drawings, and in particular to FIGS. 1 through 4 thereof, a new system for collecting plant material in an agricultural field embodying the principles and concepts of the disclosed subject matter will be described.

The applicants have recognized that the collection of stover material from the field has typically comprised a three-step process. The process may include utilizing an apparatus for mowing and/or shredding the residual crop material remaining in the field, utilizing another apparatus for raking the stover material into concentrated bands, or windrows, on the field surface, and utilizing yet another apparatus to pick up the stover material from the windrow and collecting the material in a bin or forming a bale of the material. The applicants have also recognized that this three-step process, utilized to maximize the amount of the available stover material collected from the field, requires multiple traverses of the field with multiple apparatus and thus requires a significant amount of time, equipment, and fuel to accomplish. Further, the applicants have recognized that the passage of agricultural equipment over the stover material, as well as the passage of time after initial harvest, can make collection of the stover material more difficult.

In aspects, the disclosure integrates the gathering function with the collecting function, and may also integrate the function of cutting or comminution of the plant material with the gathering and collecting functions, so that these functions can be performed in a single pass of an apparatus over the field surface. The gathering function may also include lifting or raising the plant material with respect to the ground surface proximate to an intake opening to increase the effectiveness of the collection of the plant material. Optionally, the gathering function may further include extending or expanding the lateral reach of the plant material collection along the ground surface.

Broadly, the disclosure relates to an agricultural system 1 for collecting plant material located in an agricultural field, such as plant material that has been previously severed from being connected to the ground surface and/or having fallen from the growing plant to the ground surface, when the grain of the plant in the field was harvested. The system 1 may be configured to collect plant material lying on (or near) the ground surface 2.

The system 1 may also be characterized by including, in some aspects of the disclosure, a power unit 10 configured to move across an agricultural field. Illustratively, the power unit may comprise a general purpose tractor or a specific purpose tractor. The power unit 10 may be configured to move an implement across the agricultural field, such as by carrying, pushing or pulling the implement across the ground surface. In some embodiments, the power unit 10 may be configured to process collected plant material. The power unit 10 may have a normal forward direction of movement during work operations. Illustratively, a power unit 10 embodied as a tractor may include a frame 12 and surface engaging elements 14 which are mounted on the frame and are configured to engage the ground surface in a manner that causes movement of the power unit across the ground surface of the field. Typically, the surface engaging elements 14 comprise wheels, but may also include other structures such as tracks. The tractor of the power unit may also include an engine 16 which is configured to operate the surface engaging elements to move the frame across the agricultural field, and a power transfer apparatus 18 connected to the engine. In illustrative embodiments, the power transfer apparatus is configured to generate pressurized hydraulic fluid for use in powering various components of the tractor as well as attachments and accessories, including implements.

The system 1 may also include an implement head 20 which may be configured to collect plant material from the agricultural field, and optionally may be configured to sever material from plants rooted in the ground of the agricultural field. The implement head 20 may be configured to be moved across the agricultural field by the power unit 10 along a path 22 of movement of the unit 10. In some embodiments, the implement head 20 may be mounted on the power unit 10, while in other embodiments the implement head 20 may trail the unit 10, such as by towing. The implement head 20 has a lateral direction 24 oriented transverse (and may be substantially perpendicular) to the path of movement 22 of the power unit. The implement head 20 may also have a central forward-rearward axis 26 which is typically aligned with the direction of movement of the head 20 when moving along the path 22. The implement head 20 may have a lateral width 28 oriented substantially parallel to the lateral direction 24 and measured transverse to the central forward-rearward axis 26.

The implement head 20 has an intake opening 30 through which plant materials move into the implement head for handling. The intake opening 30 may extend in the lateral direction 24, and may have a lateral extent in the lateral direction. Typically, stover plant material enters the intake opening 30 in a direction that is generally parallel to the direction of the path 22 of movement. The lateral extent of the opening 30 may define a normal lateral reach of the implement head for plant material along the path 22 of the head 20. While the position of the intake opening 30 is close to the ground surface 2, the opening 30 usually has some small degree of elevation above the surface 2. Typically, but not necessarily, the implement head 20 may be operated by power from the power transfer apparatus 18 of the power unit, for turning, for example, auger structures and chopping or cutting structures of the head.

In illustrative embodiments, the implement head 20 includes a housing 32 that defines the intake opening 30. The housing 32 may extend the lateral width of the implement head, and may be elongated in the lateral direction 24 of the head between opposite housing ends 34, 36. The housing 32 may have an upper edge element 38 that defines an upper boundary of the intake opening 30 and that may extend substantially horizontally in the field. The housing 32 may have opposite side edge elements 40, 42 that each define a side edge boundary of the intake opening. Generally, the side edge elements 40, 42 may be spaced in the lateral direction 24 in a horizontal direction, and may extend generally vertically in the field.

A positioning structure 50 may be included on the implement head 20, and may be movable with respect to the intake opening 30 of the head 20. The positioning structure 50 may be movable in an upward direction away from the ground surface and a downward direction toward the ground surface. The positioning structure 50 may be movable in the upward direction toward a lowered position 52 (see FIG. 1) and in the upward direction toward a raised position 54 (see FIG. 2). In embodiments, the positioning structure 50 may be pivotable with respect to the housing 32 of the head, and may be pivotably mounted on the housing. In illustrative embodiments, the positioning structure 50 may be a component of the implement head, such as a cover of the head which is configured to cover at least a portion of the intake opening 30. In optional embodiments, the positioning structure 50 is a part or structure added to the implement head 20.

Advantageously, the system 1 may further include a material gathering apparatus 60 for gathering plant material with respect to the input opening to enhance collection of plant material in the agricultural field. The material gathering apparatus 60 may be configured to engage plant material lying on and/or located adjacent to the ground surface which may increase the likelihood that the material or enter the intake opening 30 above the ground surface. In embodiments, the material gathering apparatus 60 may also move plant material laterally inwardly toward the intake opening and may move material toward the central axis 26.

The material gathering apparatus 60 may be selectively positionable forward of the intake opening, so that the functionality of the apparatus 60 may be selectively utilized or removed from operation. Illustratively, the gathering apparatus 50 may be movable between an operational position 62 (see FIG. 1) in front of the intake opening 30 and proximate to the ground surface to engage plant material adjacent the ground surface and an inactive position 64 (see FIG. 2) raised to a vertical level higher than the operational position such that the apparatus is not proximate the ground surface, and generally unable to engage plant material adjacent to the ground surface.

The gathering apparatus 60 may be carried or supported by the implement head 20, or structure of the head, such as the positioning structure 50. The gathering apparatus 60 may be movable with the positioning structure 50. In such embodiments, the operational position 62 of the gathering apparatus may correspond to the lowered position 52 of the positioning structure, and the inactive position 64 may correspond to the raised position 54 of the positioning structure. Illustratively, the gathering apparatus 60 may be mounted on the positioning structure, such as the over of the implement head.

In the illustrative embodiments, the material gathering apparatus 60 may comprise a plurality of rake assemblies 66, 68 with each of the rake assemblies being configured to engage the plant material in the field. The rake assemblies 66, 68 of the plurality may be positionable proximate to the intake opening such that the action of the rake assemblies tends to move the plant material to positions adjacent to the intake opening, such as positions forward of the intake opening so that forward movement of the implement head further moves the material toward and into the opening. The rake assemblies 66, 68 may move the plant material to positions above the ground surface 2 which are more easily accessed or intercepted by the intake opening 30 of the implement head advancing across the ground surface of the field. Optionally, the action of the rake assemblies 66, 68, may also move the plant material laterally inward, and toward the central axis 26 of the head.

The plurality of rake assemblies 66, 68 may be arranged in an array 70. The rake assemblies of the array 70 may be collectively movable between the operational and inactive positions, and may be movable in a substantially vertical direction upwardly and downwardly with respect to the implement head. Further, in embodiments, each of the rake assemblies 66, 68 may be movable in a substantial vertical direction independent of another rake assembly to provide independent conformity of the position of a rake assembly to contours or objects encountered in the agricultural field. The number of rake assemblies in the array 70 may vary, and typically may be selected based upon the lateral width 28 of the head 20 or the intake opening 30 relative to the size or reach (in the lateral direction 24) of the individual raking elements. The respective paths, and corresponding lateral reaches, of the individual raking elements moving over the ground surface may be distinct from each other or the paths may overlap each other to some degree.

In embodiments, the array 70 may be substantially linear, although some degree of deviation from perfect linearity may be utilized. The array 70 of rake assemblies may extend along the intake opening 30 of the implement head, and the array 70 may be positioned generally forwardly of the intake opening when the positioning structure 50 is in the lowered position. In some embodiments, the array 70 of assemblies may be positioned at approximately the same vertical level of the intake opening when the positioning member is in the lowered position. The array 70 of rake assemblies may extend transversely with respect to the path 22 of movement of the power unit.

Advantageously, in some embodiments, the array 70 of rake assemblies may extend beyond the lateral width 28 of the implement head in the lateral direction 24. For example, the array 70 may extend beyond one of the ends 34, 36 of the housing of the implement head, and may extend beyond both of the housing ends. The resulting lateral reach 71 of the array 70 of rake assemblies may thus extend beyond the lateral width 28 of the implement head.

In illustrative embodiments, one or more of the rake assemblies 66, 68 may include a rake support arm component 72 which is mounted on the positioning structure 50. Illustratively, the support arm component 72 may comprise a support arm 74 extending from the positioning structure, a pivot mount 76 mounting the support arm on the positioning structure, and a biasing member 78 that biases the support arm on the pivot mount in a downward direction, such as toward the ground surface when the gathering apparatus 60 is in the operation position 62. Illustratively, the biasing member 78 may comprise a spring or a spring-emulating element.

One or more of the rake assemblies 66, 68 may also include a rake wheel device 80 which is supported on the rake support arm component 72 on the positioning structure. Illustratively, the rake wheel device 80 may comprise a plurality of tines 82 which terminate in tine tips or ends 84. The tine ends 84 may be located adjacent to the ground surface when the positioning structure is in the lowered position 52, and the ends may be withdrawn from being adjacent to the ground surface in the raised position 54 of the positioning structure. The biasing member 78 in combination with the support arm on the pivot mount of the support arm component 72 may permit each of the rake wheel devices to rise and fall independently to adjust to variations in the ground surface or obstructions.

In the illustrative embodiments, the rake wheel device 80 comprises a central hub 86 from which the plurality of tines 82 radiate. Illustratively, the central hub 86 may define a rake plane, and the tine ends 84 of the tines may form a substantially circular periphery of the device 80. The central hub 86 may be rotatably mounted on the rake support arm component 72 and may rotate about a rake axis 88 perpendicular to the rake plane.

Figure 4:
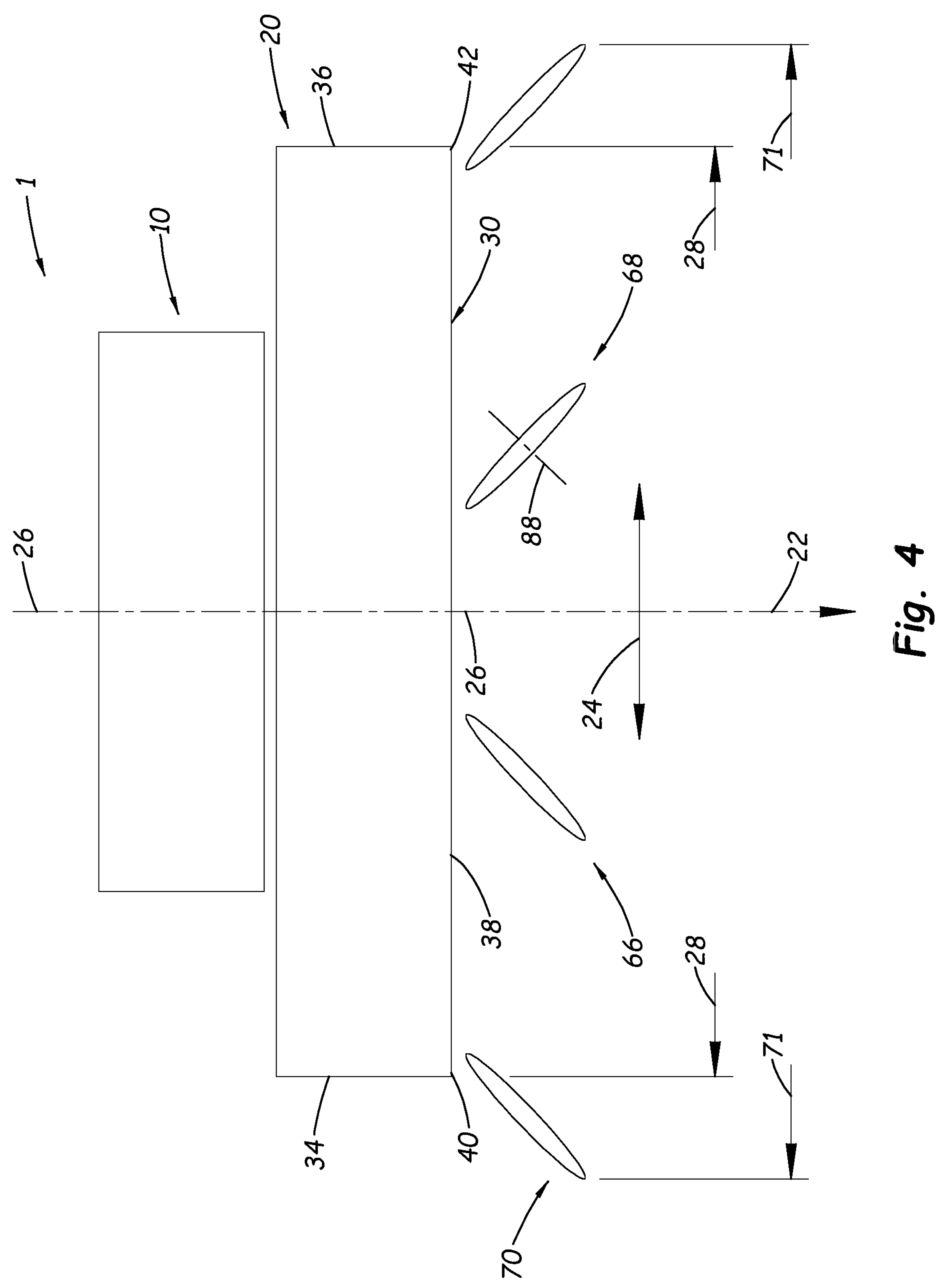
FIG. 4 is a diagrammatic top view of elements of the system, according to an illustrative embodiment.

In some embodiments, the rake axes 88 of the rake wheel devices are oriented so that when the gathering apparatus is installed on the positioning structure 50 and the gathering apparatus 60 is in the operational position, forward movement of the apparatus 60 over the ground surface causes the tine ends 82 to contact the ground surface and/or the tines 82 to contact plant material on the ground surface, and may cause rotation of the rake wheel devices 80. The rotating of the rake wheel devices 80 in turn tends to cause tines 82 to move plant material upwardly from the ground surface 2, and may also move plant material inwardly in the lateral direction toward the central axis and toward the intake opening. In embodiments, the rake axes 88 of the wheel devices may be oriented at oblique angles to the path 22 of movement and/or the central forward-rearward axis 26 and/or the lateral direction 24. Illustratively, the rake axes 88 of the wheel devices 80 may generally extend forwardly and laterally inward, and also may extend rearwardly and laterally outward. The rake axes 88 may also extend forwardly and slightly upwardly, and may also extend rearwardly and slightly downwardly. Optionally, the relative angles of the rake axes 88 of the respective rake wheel devices of the array may be oriented at different angles, and may vary according to factors such as relative proximity to the central axis 26, the number of rake assemblies in the array 70, the relative closeness of adjacent rake assemblies to each other, etc. As a further option, one or more of the rake wheel devices 80 may also be movable between a usage orientation, in which the orientation of the wheel device 80 facilitates the effective operation of the gathering apparatus 60, and a storage or transport orientation, in which the orientation of the wheel device 80 facilitates the storage and/or transport of the gathering apparatus during periods when the apparatus 60 is not being used. In illustrative embodiments, the orientation of the wheel devices in the usage orientation may be as described herein for optimizing the performance of the functions described. In such illustrative embodiments, the rake wheel devices 80 in the storage orientation may have the devices 80 being oriented closer to the implement head 20, or the positioning structure 50, and may be characterized by the rake planes of the devices 80 being oriented substantially parallel to the lateral direction 24 to minimize protrusion or extension of the devices from the positioning structure 50 and, when applicable, the housing 32 of the implement head. Illustratively, FIG. 4 shows an illustration of the usage orientation, while the storage orientation may have the rake axes 88 of the wheel devices oriented substantially perpendicular to, for example, the upper edge element 38 of the intake opening.

In other embodiments of the apparatus 10, the rake wheel device 80 may comprise a rake frame on which the plurality of tines 82 are mounted, and the rake frame may include a plurality of frame bars with the tines being mounted on the frame bars. Non-limiting examples of types of rake apparatus that may utilized include twin basket rake apparatus, rotary rake apparatus, and carted rake apparatus.

Non-limiting examples of the power unit 10 and/or the implement head 20 of the system may include a direct cut header machine mounted on a tractor and a hay pickup header machine mounted on a tractor, with the material gathering apparatus 60 being mounted or otherwise supported on the header of the combination. In another example, the system may include a tractor power unit towing a self-loading forage wagon, with the gathering apparatus 60 being mounted on the mechanism performing the self-loading functionality.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An agricultural system for collecting plant material near the ground surface of an agricultural field, the system comprising:

an implement head configured to be moved across the agricultural field by a power unit along a path of movement to collect plant material from the field, the implement head having a lateral direction oriented transverse to the path of movement, the implement head having an intake opening through which plant materials move into the implement head, the intake opening extending in the lateral direction, the implement head having a forward-rearward axis oriented substantially perpendicular to the lateral direction and located central to a lateral width of the of the implement head, and a material gathering apparatus for enhancing collection of plant material in the agricultural field, the material gathering apparatus being carried by the implement head, the material gathering apparatus being selectively positionable forward of the intake opening, the material gathering apparatus being movable between an operational position in front of the intake opening and proximate to the ground surface to engage plant material adjacent the ground surface and an inactive position raised to a higher vertical level than the operational position so as to not be proximate the ground surface; and wherein the material gathering apparatus comprises a plurality of rake assemblies, each of the rake assemblies including a rake wheel device rotatable about a rake axis;

wherein the plurality of rake assemblies are arranged in an array proximate to the intake opening, the array of rake assemblies being substantially linear, the linear array of rake assemblies extending along the intake opening of the implement head and being oriented in a substantially parallel relationship to the intake opening when the material gathering apparatus is in the operational position; and wherein the rake assemblies are configured such that the action of the rake assemblies tends to move the plant material in an upward direction with respect to the ground surface to facilitate collection of the plant material by the intake opening and the rake assemblies are configured such that forward movement of the material gathering apparatus over the ground surface with the apparatus in the operational position causes tine ends of the rake wheel device to contact the ground surface or plant material on the ground surface to produce rotation of the rake wheel devices about the rake axes;

wherein the material gathering apparatus is configured such that each said rake wheel device is oriented such that the rake axis of the device extends forwardly and laterally inward toward the forward-rearward axis and the rake axis of the device extends rearwardly and laterally outward away from the forward-rearward axis; and wherein the material gathering apparatus is configured such that each said rake wheel device is oriented such that the rake axis of the device extends forwardly and upwardly and the rake axis of the device extends rearwardly and downwardly.

2. The system of claim 1 wherein the material gathering apparatus is configured to move plant material in the lateral direction toward the central forward-rearward axis of the implement head.

3. The system of claim 1 wherein the implement head includes a positioning structure movable with respect to the intake opening of the implement head between a lowered position and in the upward direction toward a raised position.

4. The system of claim 3 wherein the positioning structure is a component of the implement head.

5. The system of claim 4 wherein the positioning structure comprises a cover of the implement head configured to cover at least a portion of the intake opening.

6. The system of claim 3 wherein the material gathering apparatus is movable with the positioning structure of the implement head such that the operational position of the material gathering apparatus corresponds to the lowered position of the positioning structure and the inactive position corresponds to the raised position of the positioning structure.

7. The system of claim 6 wherein the material gathering apparatus is mounted on the positioning structure to move with the positioning structure.

8. The system of claim 1 wherein the material gathering apparatus is configured to move plant material inwardly toward the intake opening and toward the forward rearward axis.

9. The system of claim 1 wherein the rake assemblies of the array are collectively movable in a substantially vertical direction with respect to the implement head.

10. The system of claim 9 wherein each of the rake assemblies of the array are movable in a substantially vertical direction independent of another one of the rake assemblies.

11. The system of claim 1 wherein the array of rake assemblies is positioned forwardly of the intake opening when the material gathering apparatus is in the operational position.

12. The system of claim 1 wherein the array of rake assemblies extends laterally beyond a lateral width of the implement head in the lateral direction to extend a lateral reach of the implement head beyond the intake opening.

13. The system of claim 12 wherein the array of rake assemblies extends beyond ends of the of the implement head to extend a lateral reach of the implement head beyond the intake opening.

14. The system of claim 3 wherein each of the rake assemblies comprises:

a rake support arm component mounted on the positioning structure; and wherein the rake wheel device is supported on the rake support arm component, the rake wheel device having a plurality of tines with tine ends, the tine ends being located adjacent to the ground surface when the positioning structure is in the lowered position.

15. The system of claim 1 additionally comprising a power unit configured to move across an agricultural field, the power unit comprising a frame, surface engaging elements mounted on the frame and configured to engage the ground surface, and an engine configured to operate the surface engaging elements to move the frame across the agricultural field, the implement head being mounted on the power unit to move the implement head across the agricultural field.

16. An agricultural system for collecting plant material near the ground surface of an agricultural field, the system comprising:

an implement head configured to be moved across the agricultural field by a power unit along a path of movement to collect plant material from the field, the implement head having a lateral direction oriented transverse to the path of movement, the implement head having an intake opening through which plant materials move into the implement head, the intake opening extending in the lateral direction, the implement head having a forward-rearward axis oriented substantially perpendicular to the lateral direction and located central to a lateral width of the of the implement head, and a material gathering apparatus for enhancing collection of plant material in the agricultural field, the material gathering apparatus being carried by the implement head, the material gathering apparatus being selectively positionable forward of the intake opening, the material gathering apparatus being movable between an operational position in front of the intake opening and proximate to the ground surface to engage plant material adjacent the ground surface and an inactive position raised to a higher vertical level than the operational position so as to not be proximate the ground surface; and wherein the material gathering apparatus comprises a plurality of rake assemblies, each of the rake assemblies comprising a rake wheel device rotatable about a rake axis and a rake support arm component on which the rake wheel device is mounted to rotate about the rake axis;

wherein the plurality of rake assemblies are arranged in an array proximate to the intake opening, the array of rake assemblies being substantially linear, the linear array of rake assemblies extending along the intake opening of the implement head and being oriented in a substantially parallel relationship to the intake opening; and wherein the rake assemblies are configured such that the action of the rake assemblies tends to move the plant material in an upward direction with respect to the ground surface to facilitate collection of the plant material by the intake opening and the rake assemblies are configured such that forward movement of the material gathering apparatus over the ground surface with the apparatus in the operational position causes tine ends of the rake assemblies to contact the ground surface or plant material on the ground surface to produce rotation of the rake wheel devices about the rake axes;

wherein the rake support arm component of each said rake assembly is configured such that the rake wheel device of said rake assembly is oriented such that the rake axis of the device extends forwardly and laterally inward toward the forward-rearward axis and the rake axis of the device extends rearwardly and laterally outward away from the forward-rearward axis; and wherein the rake support arm component of each said rake assembly is configured such that the rake wheel device of said rake assembly is oriented such that the rake axis of the device extends forwardly and upwardly and the rake axis of the device extends rearwardly and downwardly.

* * * * *